United States Patent
Au (10) Patent No.: US 11,469,503 B2
(45) Date of Patent: Oct. 11, 2022

(54) SELF-OPTIMIZING WIDE BAND ARRAY ANTENNAS

(71) Applicant: T-Mobile USA, Inc., Bellevue, WA (US)

(72) Inventor: Chad Au, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 156 days.

(21) Appl. No.: 16/804,906

(22) Filed: Feb. 28, 2020

(65) Prior Publication Data

US 2021/0273333 A1    Sep. 2, 2021

(51) Int. Cl.
*H01Q 5/335*    (2015.01)
*H04B 1/10*    (2006.01)

(52) U.S. Cl.
CPC .......... *H01Q 5/335* (2015.01); *H04B 1/109* (2013.01); *H04B 1/1027* (2013.01)

(58) Field of Classification Search
CPC ....... H01Q 5/335; H04B 1/109; H04B 1/1027
See application file for complete search history.

(56) References Cited

U.S. PATENT DOCUMENTS

| | | | | |
|---|---|---|---|---|
| 3,911,442 A * | 10/1975 | Hatch | ................ | H01Q 21/0031 343/754 |
| 5,859,854 A * | 1/1999 | Reudink | ................... | H04J 1/08 370/335 |
| 6,731,953 B1 * | 5/2004 | McGowan | ........... | H04B 7/2621 455/562.1 |
| 8,045,660 B1 * | 10/2011 | Gupta | ................. | H04L 27/2649 375/350 |
| 10,075,199 B2 * | 9/2018 | King | ....................... | H04L 5/001 |
| 10,993,242 B1 * | 4/2021 | Kim | ...................... | H04L 5/0023 |
| 2004/0014435 A1 * | 1/2004 | Woo | ....................... | H03D 7/165 455/127.2 |
| 2006/0293087 A1 * | 12/2006 | Tsutsui | ................... | H04B 7/086 455/562.1 |
| 2008/0119198 A1 * | 5/2008 | Hettstedt | ............... | H04W 16/06 455/453 |
| 2009/0168924 A1 * | 7/2009 | Gomez | .................... | H04B 1/18 375/340 |
| 2013/0039229 A1 * | 2/2013 | Park | ....................... | H04B 1/005 370/280 |
| 2014/0003300 A1 * | 1/2014 | Weissman | ............ | H04B 7/0404 370/310 |
| 2014/0226762 A1 * | 8/2014 | Maltsev | ............... | H04B 7/0413 375/340 |
| 2014/0328307 A1 * | 11/2014 | Takano | ................. | H04W 24/02 370/329 |

(Continued)

*Primary Examiner* — Jinsong Hu
*Assistant Examiner* — Rui M Hu
(74) *Attorney, Agent, or Firm* — Lee & Hayes, P.C.

(57) ABSTRACT

An antenna system including one or more a frequency responsive components (FRCs) may employ filters to one or more paths in the antenna system corresponding one or more radiating elements on those paths. The FRCs can block a signal from reaching the radiating elements effectively causing the radiating elements to become non-contributing to the antenna systems radiating pattern performance, and thus, maintain a consistent aperture value associated with the antenna system. In some cases, the FRCs may be configured to block a signal when the antenna system is operating at a particular frequency.

18 Claims, 7 Drawing Sheets

(56) References Cited

U.S. PATENT DOCUMENTS

| | | | |
|---|---|---|---|
| 2015/0235971 A1* | 8/2015 | Smith | H03H 7/12 |
| | | | 29/832 |
| 2016/0013831 A1* | 1/2016 | Lea | H04L 27/01 |
| | | | 455/562.1 |
| 2016/0191281 A1* | 6/2016 | Oh | H04L 25/4917 |
| | | | 375/300 |
| 2016/0259033 A1* | 9/2016 | Vladimirov | G01S 5/04 |
| 2016/0301257 A1* | 10/2016 | Parks | H02J 50/20 |
| 2016/0338075 A1* | 11/2016 | McKibben | H04W 16/02 |
| 2017/0012651 A1* | 1/2017 | Ellä | H04L 5/1461 |
| 2017/0079059 A1* | 3/2017 | Li | H04W 16/02 |
| 2017/0251380 A1* | 8/2017 | Schabel | H04W 16/14 |
| 2017/0256854 A1* | 9/2017 | Hu | H01Q 1/243 |
| 2017/0302317 A1* | 10/2017 | Horita | H04B 1/0064 |
| 2017/0373730 A1* | 12/2017 | Pehlke | H04B 7/0413 |
| 2018/0309502 A1* | 10/2018 | Khandani | H04B 7/15557 |
| 2018/0309528 A1* | 10/2018 | King | H04B 7/0825 |
| 2018/0331714 A1* | 11/2018 | See | H04B 7/0814 |
| 2019/0097606 A1* | 3/2019 | Nosaka | H04B 1/006 |
| 2019/0181839 A1* | 6/2019 | Bauder | H03H 7/0161 |
| 2019/0273314 A1* | 9/2019 | Wloczysiak | H04B 1/525 |
| 2020/0007178 A1* | 1/2020 | Gunther | H04B 1/1036 |
| 2020/0252042 A1* | 8/2020 | Mori | H03H 9/70 |
| 2020/0252879 A1* | 8/2020 | Palenius | H04W 88/085 |
| 2020/0303811 A1* | 9/2020 | Saito | H01Q 1/288 |
| 2020/0328792 A1* | 10/2020 | Wei | H04B 7/0626 |
| 2021/0194452 A1* | 6/2021 | Tsukamoto | H03H 7/1766 |
| 2021/0195513 A1* | 6/2021 | Zhang | H04W 24/10 |

\* cited by examiner

SELF-OPTIMIZING WIDE BAND ARRAY ANTENNAS

BACKGROUND

Cellular and other wireless networks are capable of sending and receiving frequencies used for data and voice communications, among other things. These voice and data connections are generally sessions originated at a central switch center and are typically transported via fiber optic cable to a radio base station (e.g., eNodeB, or eNB) for LTE or other wireless technology and propagated by the use of antenna arrays of radiating elements. Multiple radiating elements are housed in the radome of a base station antenna. The number of radiating elements and the position of the radiating elements within the radome may be constructed such that the base station is configured to operate in a specified band of frequencies, which may result in the base station antenna not performing optimally while operating over a broad specified band of frequencies.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and techniques for an antenna array that operates over a broad range of frequencies is discussed herein. As mentioned above, multiple radiating elements may be housed in a single radome, such as an antenna array housed in a radome of a base station antenna. The number of radiating elements and the position of the radiating elements that make up the antenna array may be determined such that the base station is configured to operate in a specified band of frequencies. These array antennas may form radiation pattern characteristics (e.g., gain, half power beam width, side lobe levels, etc.) based on a desired operating frequency within a frequency band. Forming the desired radiation pattern characteristics is based on an optimum number of radiating elements and their spacing, as well as control of the amplitude and phase distribution among the radiating elements. In some cases, such as with extra wide band array antennas, maintaining a balance among the design parameters of the array antenna (e.g., number of radiating elements, position of radiating elements, etc.) and radiation pattern performance for operational frequencies within a frequency band is a challenge. For example, the number of radiating elements for optimum gain and half power beam width at the low end of a frequency band may result in a half power beam width that is narrower than desired at the upper end of the frequency band, and vice versa. With the array antennas number of radiating elements and physical size being fixed, the effective electrical aperture size increases with frequency. Thus, it is necessary to keep the effective electrical aperture size relatively constant as the operating frequency changes.

As discussed herein, the term "bandwidth" can specifically refer to the band of frequencies over which an antenna can functionally operate. The term "throughput" can specifically refer to the amount of data that can be transferred (e.g., the number of bits being streamed per unit time) by a particular system or component thereof.

In some cases, and as discussed herein, a self-optimizing array antenna (e.g., linear array (1-D), two-dimensional (2-D) planar array, etc.) may maintain an effective aperture size relatively constant over a range of operating frequencies. For example, an antenna fixture may include a radome, an enclosure, or a container, as well as an array antenna having one or more radiating elements, such as a first radiating element and a second radiating element. The first radiating element may be coupled to a first frequency responsive component (FRC) and the second radiating element may be coupled to a second FRC. The first FRC may be configured to pass a first signal associated with a first frequency to the first radiating element and to filter a second signal associated with a second frequency from the first radiating element. Similarly, the second FRC may be configured to pass a third signal associated with a third frequency to the second radiating element and to filter a fourth signal associated with a fourth frequency from the second radiating element. In some cases, the antenna fixture may include a wide band passive array antenna.

Each FRC within the self-optimizing array antenna may be configured to pass signals up to a determined frequency threshold and to filter other signals above that threshold such that only the radiating elements that are determined to optimize the performance at the given frequency are receiving the signal. By incorporating an FRC to a corresponding radiating element, the pathway associated with the radiating element may be blocked from receiving the signal and effectively become non-contributing to the array antennas radiation pattern performance, and thus, maintain an antenna aperture size to yield and maintain consistent optimum radiation pattern characteristics. Depending on the bandwidth of the array antenna, multiple FRCs may be implemented for multiple radiating elements located within an array antenna.

In some examples, each FRC may be configured to filter a signal based on a frequency threshold associated with the signal such that that the effective antenna aperture size may incrementally increase/decrease for optimum radiation pattern performance. For example, the first FRC may have a threshold frequency cutoff at 817 MHz, effectively eliminating the associated radiating element from the array antenna when operating above that frequency. That is, if an array antenna included eight overall radiating elements (and one radiating element is associated with an FRC), at frequencies above 817 MHz, the array antenna would transition from operating with eight effective radiating elements to seven effective radiating elements. In some cases, the FRCs may include low pass filters. In some cases, the FRCs may be fabricated and/or etched onto a circuit board shared with a beamformer located within the radome or may be implemented as a discrete device.

In some examples, the array antenna may be coupled with or implemented with a computing device (e.g., base station) that includes one or more processors and memory storing instructions causing the one or more processors to determine which FRC should be activated in order to optimize the array antenna based on the operating frequency. For example, the array antenna may include multiple radiating elements, each being associated with a dedicated FRC. The computing device may receive an instruction to operate at a frequency within a frequency bandwidth. The computing device may determine which radiating element should receive a signal associated with the frequency based on optimizing the array antennas performance while operating at the frequency. For example, in one case, twelve elements in an array antenna may yield the desired pattern over a range of operating frequencies. However, at frequencies above and beyond those, eleven or fewer elements would be needed instead to maintain a similar pattern performance at a lower frequency band. Optimizing the array antenna's performance may include maintaining an antenna aperture size for the operating frequency. Once a subset of radiating elements for optimizing performance of the array antenna are determined, a computing device may control the FRCs to enable or disable radiating elements by, for example, re-tuning the cut-off frequency threshold, effectively causing the array antenna to adapt to operate using the radiating elements determined to optimize performance of the array antenna as conditions change.

Figure 1:
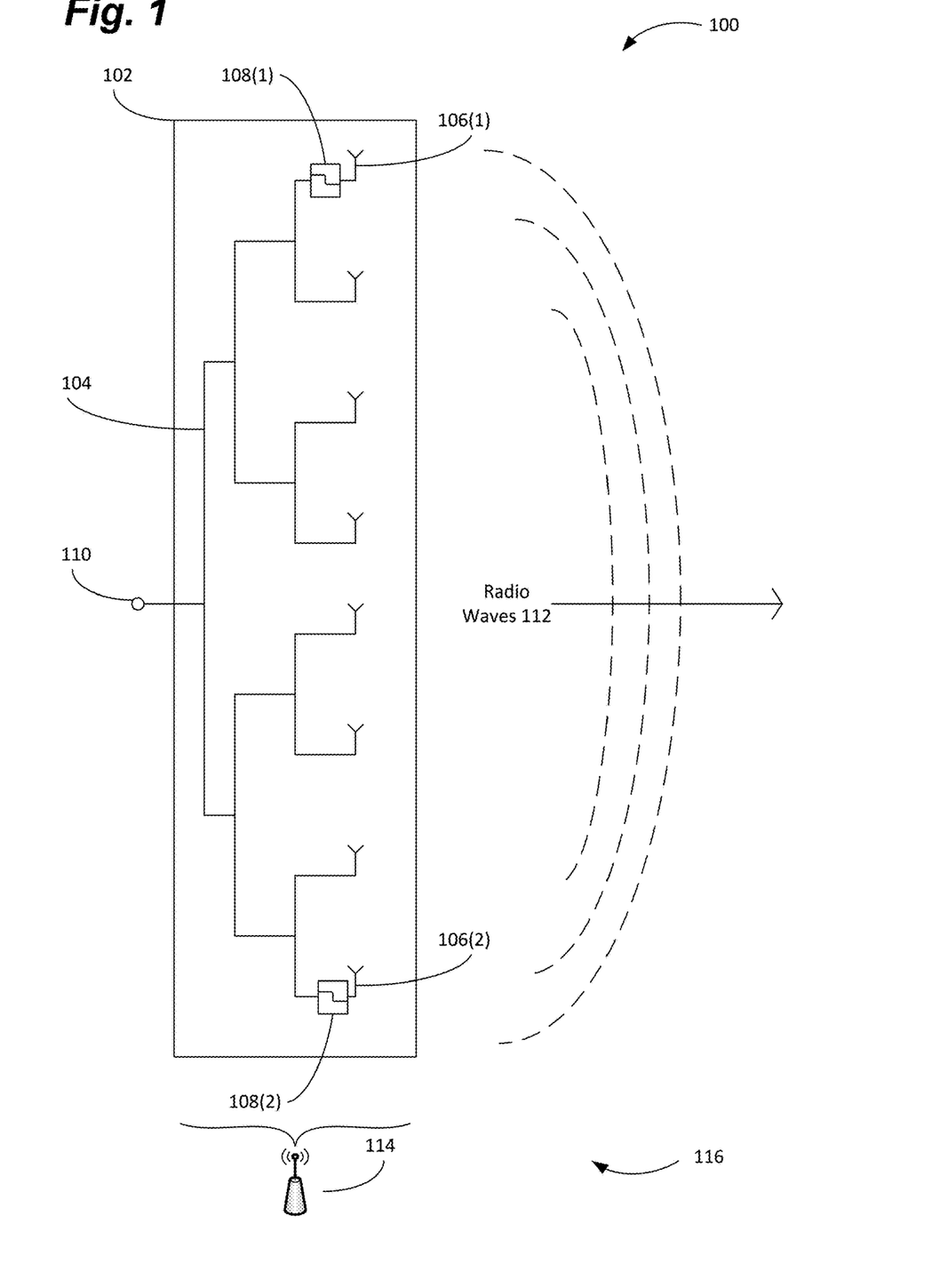
FIG. 1 depicts an example antenna system, in accordance with some examples of the present disclosure.

FIG. 1 depicts an illustrative environment 100 in which a radome 102 contains an array antenna 104 having a number of radiating elements 106(1), 106(2), . . . 106(N). The radiating elements 106(1) and 106(2) may be coupled with an FRC 108(1) and 108(2), respectively. Although only two FRCs are illustrated in FIG. 1 (i.e., FRC 108(1) and FRC 108(2)), it is to be understood that the array antenna 104 may include fewer FRCs or include more FRCs, each being associated with a respective radiating element 106. FRCs may be associated with radiating elements 106 anywhere in the array antenna 104 (e.g., middle radiating elements) to allow for altering the radiation pattern (e.g., create nulls to minimize impact from interferers or further suppress side lobes) as needed. In some cases, the FRCs 108 may be dynamically tunable. For example, a radiating element associated with an FRC may be partially reduced in efficiency to further alter the excitation of the radiating elements, providing another mechanism for radiation pattern optimization. The array antenna 104 may receive signals from a telecommunications network (not illustrated) via an antenna port 110 and convert the signals to radio waves 112 via the radiating elements 106.

In some cases, the array antenna 104 may receive a signal via the antenna port 110. The signal may be received from a telecommunications network via a wired or wireless connection and may be associated with an operating frequency. The radiating element 106(1) may be coupled to the FRC 108(1) and the radiating element 106(2) may be coupled to the FRC 108(2). Depending on the frequency that the signal is associated with, either one of, or both of, the FRC 108(1) and the FRC 108(2) may be configured to block the signal from reaching the radiating element 106(1) and/or the radiating element 106(2). For example, the FRC 108(1) and the FRC 108(2) may be configured to block signals that are associated with a frequency that is at and/or above a threshold frequency. In some cases, the threshold frequency may be the same. In other cases, the threshold frequency may be different for the FRC 108(1) and the FRC 108(2). In some cases, each radiating element 106 may be coupled with an FRC and each FRC may be configured to block signals that are associated with a frequency that is at and/or above a threshold frequency.

In one example, the FRC 108(1) may be configured to de-activate its associated radiating element 106(1) when receiving signal frequencies at and/or above 600 MHz and the FRC 108(2) may be configured to de-activate its associated radiating element 106(2) when receiving signal frequencies at and/or above 800 MHz. In this case, if the array antenna 104 receives a signal frequency of 700 MHz, then the FRC 108(1) may filter the signal from reaching the radiating element 106(1) and the FRC 108(2) may allow the signal to reach the radiating element 106(2). In another example, the element 106(1) may be configured to de-activate when receiving a signal associated with frequencies at and/or above 600 MHz and the element 106(2) may be configured to de-activate when receiving a signal associated with frequencies at and/or above 800 MHz. In this case, if the array antenna 104 receives a signal associated with a frequency of 500 MHz, then the FRC 108(1) may pass the signal, thereby allowing the signal to reach the radiating element 106(1) and the FRC 108(2) may also pass the signal, thereby allowing the signal to reach the radiating element 106(2). In another example, the FRC 108(1) may be configured to block signals when receiving a signal associated with frequencies at and/or above 600 MHz and the FRC 108(2) may be configured to block signals when receiving a signal associated with frequencies at and/or above 800 MHz. In this case, if the array antenna 104 receives a signal associated with a frequency of 810 MHz, then the FRC 108(1) may filter, block, or otherwise attenuate the signal from reaching the radiating element 106(1) and the FRC 108(2) may filter, block, or otherwise attenuate the signal from reaching the radiating element 106(2).

In this way, each FRC (e.g., FRC 108(1) and FRC 108(2)) within the array antenna 104 may be configured to pass signals associated with a determined frequency and to filter other signals associated with a determined frequency such that only the radiating elements 106 that are determined to optimize the performance at the given frequency are receiving the signal. By incorporating an FRC (e.g., FRC 108(1) and FRC 108(2)) to the radiating elements 106, the pathways associated with the radiating elements 106 may be blocked from receiving the signal and effectively become non-contributing to a radiation pattern performance associated with the array antenna 104, and thus, maintain an antenna aperture size to yield and maintain consistent optimum radiation pattern characteristics. Depending on the bandwidth of the array antenna 104, multiple FRCs may be implemented for multiple radiating elements 106 located within the array antenna 104.

In some examples, the array antenna 104 may be coupled with a computing device 114 (e.g., base station) that includes one or more processors and memory storing instructions causing the one or more processors to determine which FRC (e.g., 108(1) and/or 108(2)) should be activated and/or determine a cut-off frequency threshold that should be associated with each FRC in order to optimize the array antenna 104 based on the operating frequency associated with the received signal. For example, the computing device 114 may receive an instruction to operate at a frequency within a frequency bandwidth. The computing device 114 may determine which radiating element 106 should receive a signal associated with the frequency based on optimizing the array antennas 104 performance while operating at the frequency. For example, optimizing the array antennas 104 performance may include maintaining an antenna aperture value within a predefined threshold value while operating at the frequency. Once the radiating elements 106 that are necessary to optimize performance of the array antenna 104 are determined, the computing device 114 may cause the FRCs (e.g. the FRC 108(1) and/or the FRC 108(2)) that are coupled with the radiating elements 106 that are not going to be used to block the signal, causing the array antenna 104 to operate using the radiating elements 106 determined to optimize performance of the array antenna 104 at the specified operating frequency. In some cases, the radome 102, the array antenna 104, the radiating elements 106(1), 106(2), . . . 106(N), the FRC 108(1) and 108(2), the antenna port 110, and/or the computing device 114 may be collectively referred to as an antenna fixture 116.

In some cases, the FRC 108(1) and/or the FRC 108(2) may be adjustable such that the cut-off frequency threshold associated with each FRC may be re-tuned allowing for adjustable attenuation of the array antenna in order to "sculp" the amplitude distribution among the elements, which also allows optimization of other pattern characteristics. For instance, the computing device 114 may determine that the FRC 108(1) and/or the FRC 108(2) should block a first signal associated with a first frequency, thereby preventing the radiating element 106(1) and/or the radiating element 106(2) from receiving the first signal. Subsequently, the computing device 114 may operate at a second signal that is different than the first signal and is associated with a second frequency that is different than the first frequency. The computing device 114 may then determine if the radiating element 106(1) and/or the radiating element 106(2) would optimize the performance of the array antenna 104 when operating at the second frequency and, if so, may adjust the cut-off frequency threshold associated with the FRC 108(1) and/or the FRC 108(2) based on whether or not the radiating element 106(1) and/or the radiating element 106(2) would optimize the performance of the array antenna 104.

The array antenna 104 may be any type of array antenna used in a telecommunication system. For example, the array antenna 104 may be a linear array antenna or may be a 2-D planar array antenna. In the case of a 2-D planar array antenna, the array antenna 104 may be configured such that individual radiating elements and/or entire rows and/or columns of radiating elements are coupled with an FRC. In some cases, each row/column in a 2-D planar array antenna may share the same cut-off frequency so that the entire row and/or column would be disabled. Similarly, an array antenna with circularly arranged radiating elements may have FRCs coupled to radiating elements along a constant radii or rings of radiating elements. In some cases, the spacing of the radiating elements in an array antenna can be periodic or arbitrary. In addition, the radiating elements may not necessarily all lie within the same plane, e.g. be wrapped around a cylinder or over a complex curvature such as the leading edge of an aircraft or structure.

In a configuration, the array antenna 104 may be configured to transmit and/or receive radio waves from a number of appropriate devices, e.g., a stationary device or a portable electronic device, for communicating over a wireless communication network. Such devices include mobile telephones, cellular telephones, internet protocol (IP) telephones, mobile computers, Personal Digital Assistants (PDAs), radio frequency devices, handheld computers, laptop computers, tablet computers, palmtops, pagers, devices configured as IoT devices, IoT sensors that include cameras, integrated devices combining one or more of the preceding devices, and/or the like. As such, these devices may range widely in terms of capabilities and features. For example, in a configuration, these devices may have a numeric keypad, a capability to display only a few lines of text and be configured to interoperate with only Global System for Mobile Communications (GSM) networks. However, in another configuration, the device (e.g., a smart phone) may have a touch-sensitive screen, a stylus, an embedded Global Positioning System (GPS) receiver, and a relatively high-resolution display, and be configured to interoperate with multiple types of networks. These devices may also comprise a SIM-less device (i.e., a device that does not contain a functional subscriber identity module ("SIM")), a roaming device (i.e., a device operating outside of their home access network), and/or mobile software applications.

In a configuration, the array antenna 104 may communicate voice traffic and/or data traffic with one or more devices using radio frequency (RF) signals. The array antenna 104 may communicate with devices using one or more appropriate wireless communication protocols or standards. For example, the array antenna 104 may communicate with devices using one or more standards, including but not limited to GSM, Time Division Multiple Access (TDMA), Universal Mobile Telecommunications System (UMTS), Evolution-Data Optimized (EVDO), Long Term Evolution (LTE), Fifth Generation (5G), Generic Access Network (GAN), Unlicensed Mobile Access (UMA), Code Division Multiple Access (CDMA) protocols (including IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), Wi-Fi protocols (including IEEE 802.11 protocols), WiMAX protocols (including IEEE 802.16e-2005 and IEEE 802.16m protocols), High Speed Packet Access (HSPA) (including High Speed Downlink Packet Access (HSDPA) and High Speed Uplink Packet Access (HSUPA)), Ultra Mobile Broadband (UMB), and/or the like.

In configurations, the telecommunication network of which the array antenna 104 may be a part or may support packet-switched or circuit-switched connections and may include a number of network components. Such components may include a home location register (HLR) or HSS for storing user and device information, as well as IMS components, such as the P-CSCF and S-CSCF. The components may also include an application server(s), such as a telephony application server (TAS) or rich communication service (RCS) server. Further, the core network may include an account information server (AIS), which may provide network identities, contact addresses, credentials, and other information to communication devices.

In addition to or instead of the configuration above, in some examples the telecommunications network may include a 4G core network comprising a Mobility Management Entity (MME), a Serving Gateway (SGW), a Packet Data Network (PDN) Gateway (PGW), a Home Subscriber Server (HSS), an Access Network Discovery and Selection Function (ANDSF), an evolved Packet Data Gateway (ePDG), a Data Network (DN), and the like.

In addition to or instead of the configuration above, in some examples the telecommunications network can include a 5G core network comprising any of an Access and Mobility Management Function (AMF), a Session Management Function (SMF), a Policy Control Function (PCF), an Application Function (AF), an Authentication Server Function (AUSF), a Network Slice Selection Function (NSSF), a Unified Data Management (UDM), a Network Exposure Function (NEF), a Network Repository Function (NRF), a User Plane Function (UPF), a data network (DN), and the like.

In addition, the telecommunications network may be implemented on a single computing device. Such computing devices may each be or include a server or server farm, multiple, distributed server farms, a mainframe, a work station, a PC, a laptop computer, a tablet computer, an embedded system, or any other sort of device or devices. In one implementation, the computing device(s) represent a plurality of computing devices working in communication, such as a cloud-computing network of nodes.

Figure 2:
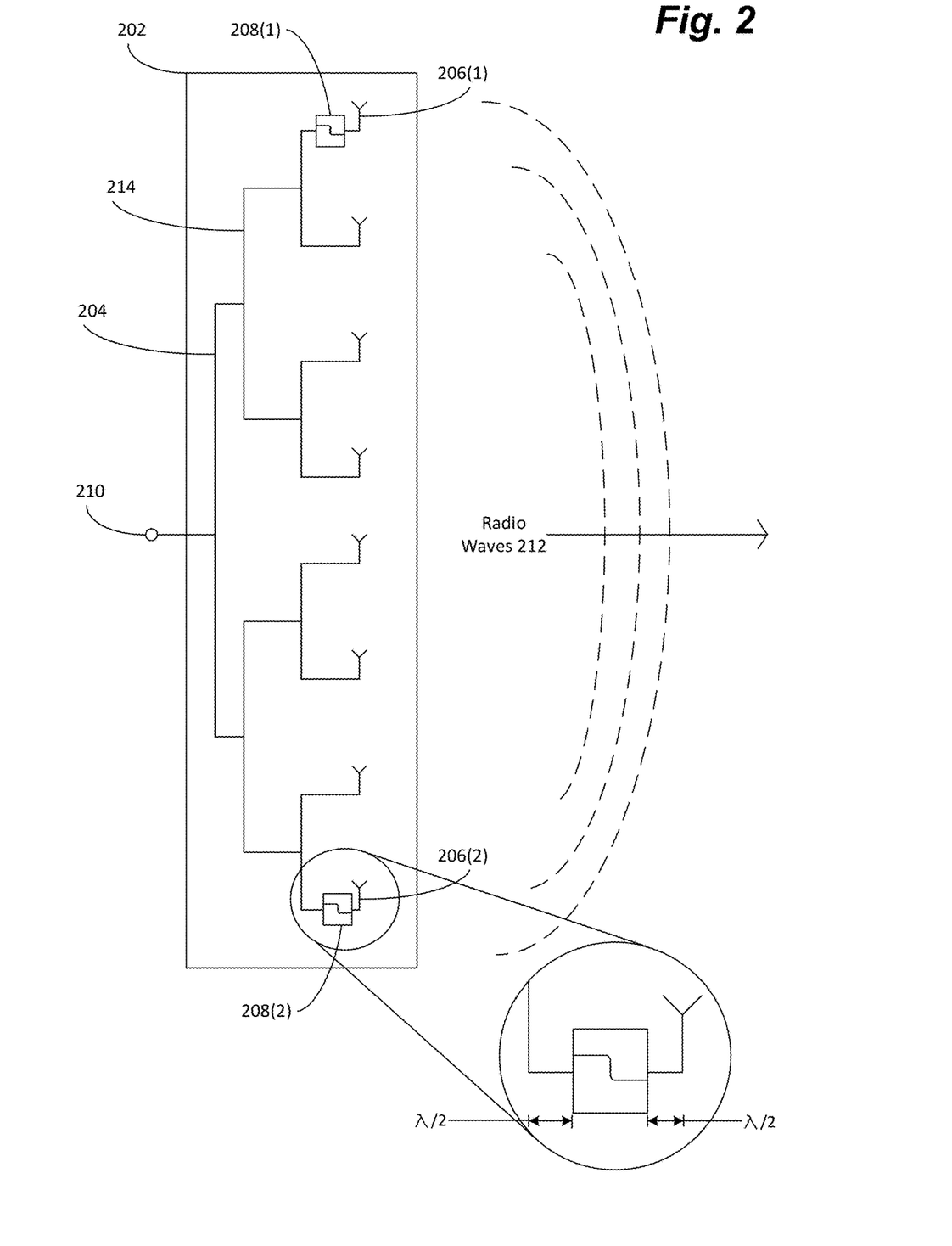
FIG. 2 depicts another example antenna system, in accordance with some examples of the present disclosure.

FIG. 2 depicts an illustrative environment 200 in which a radome 202 contains an array antenna 204 having a number of radiating elements 206(1), 206(2), . . . 206(N). The radiating elements 206(1) and 206(2) may be coupled with an FRC 208(1) and 208(2), respectively. The radome 202, the array antenna 204, the radiating elements 206, and the FRCs 208 may be the same or similar to the radome 102, the array antenna 104, the radiating elements 106, and the FRCs 108, as illustrated in FIG. 1. Although only two FRCs are illustrated in FIG. 2 (i.e., FRC 208(1) and FRC 208(2)), it is to be understood that the array antenna 204 may include fewer FRCs or include more FRCs, each being associated with a respective radiating element 206. The array antenna 204 may receive signals from a telecommunications network (not illustrated) via an antenna port 210 and convert the signals to radio waves 212 via the radiating elements 206.

In some cases, the array antenna 204 may receive a signal associated with a frequency that the FRC 208(1) may block, but the FRC 208(2) does not block, thereby preventing the signal from reaching the radiating element 206(1). In this case, the signal being provided to the upper arm 214 of the array antenna 204 may encounter a discontinuity in the pathways that make up the upper arm 214 and the applied signal may be reflected back to the origin of the signal (i.e., the antenna port 210). To minimize the effect of the discontinuity, the array antenna 204 may be configured such that the incident signal and the reflected signal will cancel each other out. For example, the upper arm 214 may be of a length that, when the FRC 208(1) is activated and the signal is reflected back, the incident signal and the reflected signal are canceled out, preventing any degradation of the array antenna 204.

Figure 3A:
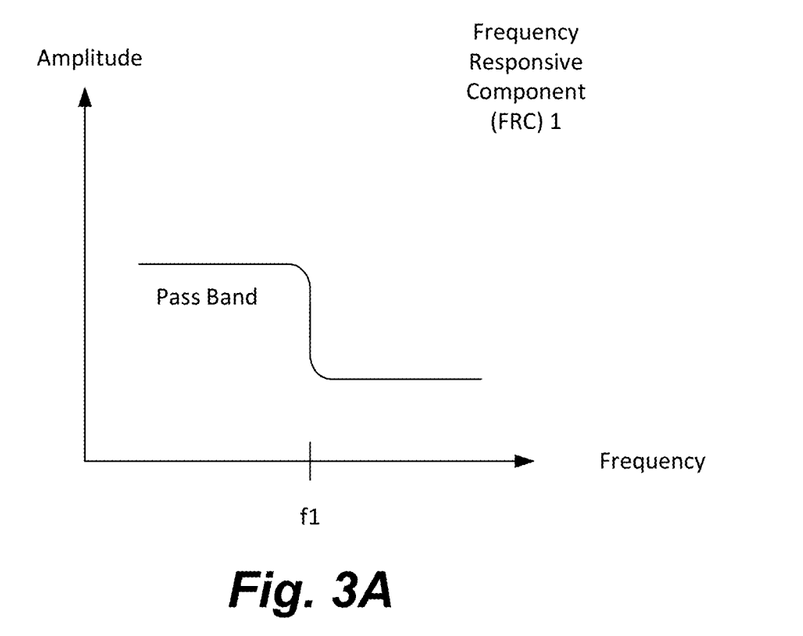
FIG. 3A depicts a graphical representation illustrating the effects of a frequency response component, in accordance with some examples of the present disclosure.
Figure 3B:
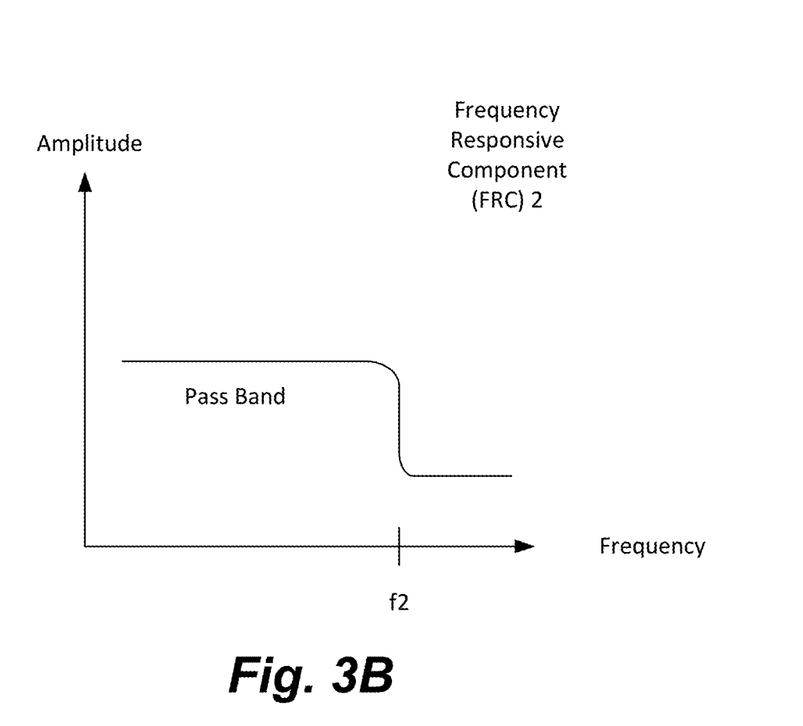
FIG. 3B depicts a graphical representation illustrating the effects of a frequency response component, in accordance with some examples of the present disclosure.

FIGS. 3A and 3B illustrate graphs representing an amplitude of a signal provided to a radiating element, such as radiating elements 106(1) and 106(2), as the frequency varies when the radiating elements are coupled with an FRC, such as FRC 108(1) and FRC 108(2). For example, FIG. 3A illustrates that, at frequency 1 (f1), the FRC1 is configured to block the signal associated with the frequency 1 and the amplitude of the signal provided to the radiating element, such as radiating element 106(1) and/or 106(2), decreases to a lesser amount and maintains that amount as the frequency increases. Similarly, FIG. 3B illustrates that, at frequency 2 (f2), the FRC2 is configured to block the signal associated with the frequency 2 and the amplitude of the signal provided to the radiating element, such as radiating element 106(1) and/or 106(2), decreases to a lesser amount and maintains that amount as the frequency increases.

As illustrated in FIGS. 3A and 3B, the frequency in which the FRCs, such as FRC 108(1) and 108(2), are configured to block may vary. For instance, the FRC1 of FIG. 3A may be configures to block a signal associated with a lower frequency (i.e., f1) then the frequency in which FRC2 of FIG. 3B is configured to block (i.e., f2). The FRCs may be configured to block a signal associated with any frequency in order to optimize the performance of the array antenna when the array antenna is operating at a specific frequency.

Figure 4:
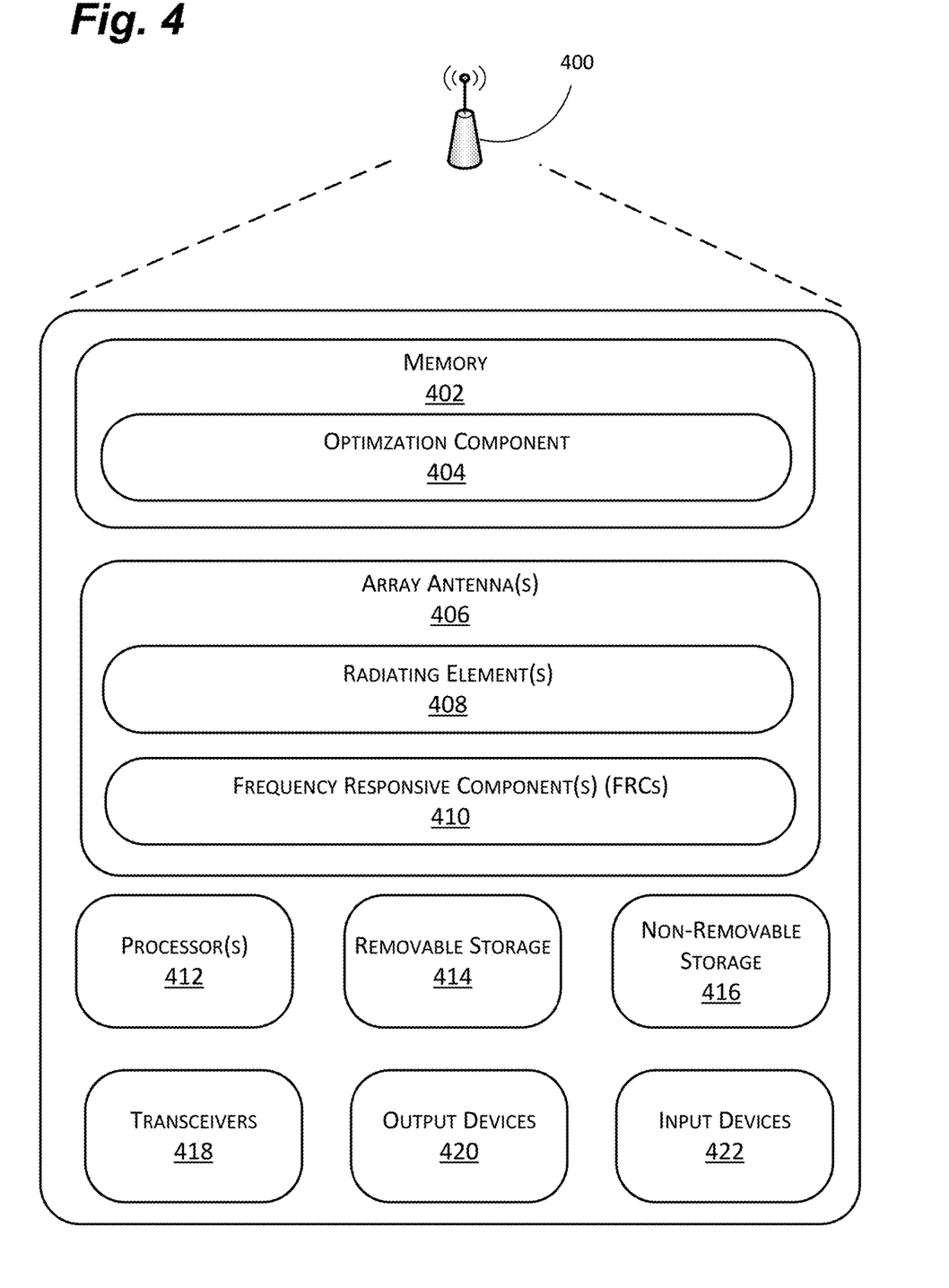
FIG. 4 depicts a component level view of a computing device housing an array antenna, in accordance with some examples of the present disclosure.

FIG. 4 illustrates a component level view of an example computing device 400 that may be used to optimize performance of an array antenna. The computing device 400 may be an example of computing device 114, another network device, or any combination thereof. As illustrated, the computing device 400 comprises a system memory 402 storing an optimization component 404. Also, the computing device 400 can include an array antenna 406, radiating elements 408, frequency responsive components (FRC) 410, a processor(s) 412, a removable storage 414, a non-removable storage 416, transceivers 418, output device(s) 420, and input device(s) 422.

In some cases, the optimization component 404 may monitor conditions of the computing device 400. For example, the optimization component 404 may determine which FRC 410 should block a signal in order to optimize the array antenna 406 based on an operating frequency associated with the received signal. For example, the optimization component 404 may receive an instruction to operate at a frequency within a frequency bandwidth. The optimization component 404 may determine which radiating elements 408 should receive a signal associated with the frequency based on optimizing the array antennas 406 performance while operating at the frequency. For example, optimizing the array antennas 406 performance may include determining an antenna aperture value associated with the array antenna 406. The optimization component 404 may determine which radiating elements 408 are necessary to operate the array antenna 406 at the required frequency while maintaining the antenna aperture value within a predefined threshold. Once the radiating elements 408 that are necessary to optimize performance of the array antenna 406 are determined, the optimization component 404 may cause the FRCs 410 that are coupled with the radiating elements 408 that are not going to be used to block the signal, effectively causing the array antenna 406 to only operate using the radiating elements 408 determined to optimize performance of the array antenna 406 at the specified operating frequency. In some cases, the optimization component may adjust the cut-off frequency threshold associated with each FRC in order to cause the FRCs to block the signal.

In some implementations, the processor(s) 412 is a central processing unit (CPU), a graphics processing unit (GPU), or both CPU and GPU, or any other sort of processing unit. The computing device 400 may also include additional data storage devices (removable and/or non-removable) such as, for example, magnetic disks, optical disks, or tape. Such additional storage is illustrated in FIG. 4 by removable storage 414 and non-removable storage 416.

Non-transitory computer-readable media may include volatile and nonvolatile, removable and non-removable tangible, physical media implemented in technology for storage of information, such as computer readable instructions, data structures, program modules, or other data. System memory 402, removable storage 414, and non-removable storage 416 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the computing device 400. Any such non-transitory computer-readable media may be part of the computing device 400.

In some implementations, the transceivers 418 include any sort of transceivers known in the art. For example, the transceivers 418 may include wired communication components, such as an Ethernet port, for communicating with other networked devices. Also, or instead, the transceivers 418 may include wireless modem(s) to facilitate wireless connectivity with other computing devices. Further, the transceivers 418 may include a radio transceiver that performs the function of transmitting and receiving radio frequency communications via an antenna.

In some implementations, the output devices 420 include any sort of output devices known in the art, such as a display (e.g., a liquid crystal display), speakers, a vibrating mechanism, or a tactile feedback mechanism. Output devices 420 also include ports for one or more peripheral devices, such as headphones, peripheral speakers, or a peripheral display.

In various implementations, input devices 422 include any sort of input devices known in the art. For example, input devices 422 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 5:
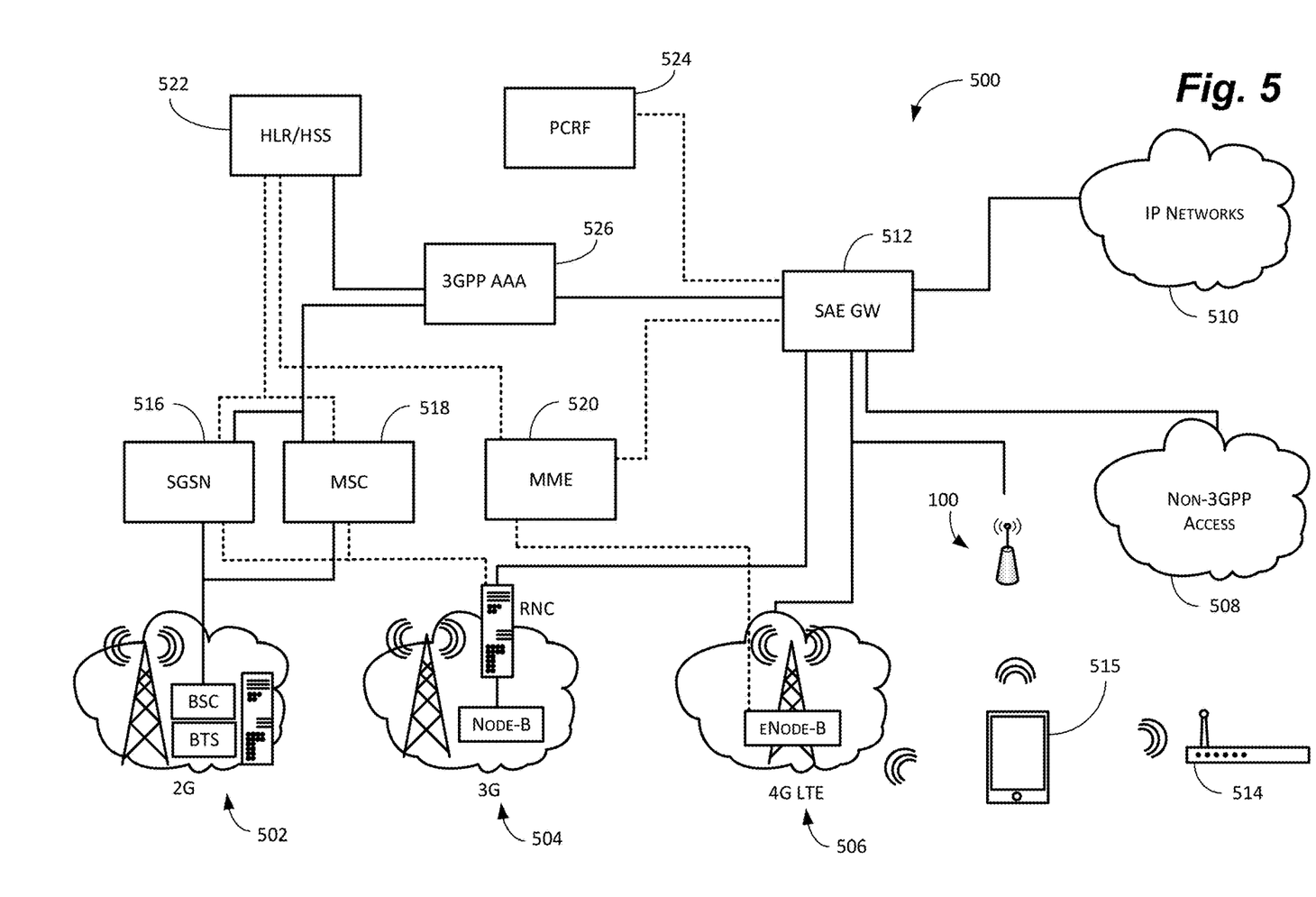
FIG. 5 depicts an overview and example environment, including a computing device housing an array antenna, in accordance with some examples of the present disclosure.

As shown in FIG. 5, the environment 100 can be used in conjunction with a number of wireless communications networks. As mentioned above, the environment 100 described herein can be used to optimize performance of an array antenna. As shown, the environment 100 can be connected to the cellular backbone in a suitable manner to provide localized throughput to users in a compact, cost-effective, targeted manner. To this end, FIG. 5 depicts a conventional cellular network 500 including 2G 502, 3G 504, and 4G long-term evolution (LTE) network 506 components. Of course, other technologies, such as, for example, 5G and device-to-device (D2D) components could also be included and are contemplated herein. For example, the environment 100 may include a gNodeB for use in connection with a 5G protocol.

As is known in the art, data can be routed from the Internet or other sources using a circuit switched modem connection (or non-3GPP connection) 908, which provides relatively low data rates, or via IP network 510 (packet switched) connections, which results is higher throughput. The LTE network 506, which is purely IP based, essentially "flattens" the architecture, with data going straight from the internet to the service architecture evolution gateway (SAE GW) 512 to evolved Node B (LTE system 506) transceivers, enabling higher throughput. Many electronic devices 515 also have wireless local area network (WLAN) 514 capabilities, in some cases enabling even higher throughput. In some cases, cellular carriers may use WLAN communications in addition to, or instead of, cellular communications to supplement throughput.

The serving GPRS support node (SGSN) 516 is a main component of the general packet radio service (GPRS) network, which handles all packet switched data within the network 500—e.g. the mobility management and authentication of the users. The MSC 518 essentially performs the same functions as the SGSN 516 for voice traffic. The MSC 518 is the primary service delivery node for global system for mobile communication (GSM) and code division multiple access (CDMA), responsible for routing voice calls and short messaging service (SMS) messages, as well as other services (such as conference calls, fax, and circuit switched data). The MSC 518 sets up and releases the end-to-end connection, handles mobility and hand-over requirements during the call, and takes care of charging and real time pre-paid account monitoring.

Similarly, the mobility management entity (MME) 520 is the key control-node for the 4G LTE network 506. It is responsible for idle mode electronic device 515 paging and tagging procedures including retransmissions. The MME 520 is involved in the bearer activation/deactivation process and is also responsible for choosing the SAE GW 512 for the electronic device 515 at the initial attach and at time of intra-LTE handover involving Core Network (CN) node relocation (i.e., switching from one cell tower to the next when traveling). The MME 520 is responsible for authenticating the user (by interacting with the HSS 522 discussed below). The Non-Access Stratum (NAS) signaling terminates at the MME 520 and it is also responsible for generation and allocation of temporary identities to the electronic device 515. The MME 520 also checks the authorization of the electronic device 515 to camp on the service provider's HPLMN or VPLMN and enforces electronic device 515 roaming restrictions on the VPLMN. The MME 520 is the termination point in the network for ciphering/integrity protection for NAS signaling and handles the security key management. The MME 520 also provides the control plane function for mobility between LTE network 906 and 2G 902/3G 904 access networks with the S3 interface terminating at the MME 520 from the SGSN 516. The MME 520 also terminates the S6a interface towards the home HSS 522 for roaming electronic device 515.

The HSS/HLR 522 is a central database that contains user-related and subscription-related information. The functions of the HSS/HLR 522 include functionalities such as mobility management, call and session establishment support, user authentication and access authorization. The HSS, which is used for LTE connections, is based on the previous HLR and Authentication Center (AuC) from CGMA and GSM technologies, with each serving substantially the same functions for their respective networks.

The policy and charging rules function (PCRF) 524 is a software node that determines policy rules in the network 500. The PCRF 524 is generally operates at the network core and accesses subscriber databases (e.g., the HSS/HLR 522) and other specialized functions in a centralized manner. The PCRF 524 is the main part of the network 500 that aggregates information to and from the network 500 and other sources (e.g., IP networks 510). The PCRF 524 can support the creation of rules and then can automatically make policy decisions for each subscriber active on the network 500. The PCRF 524 can also be integrated with different platforms like billing, rating, charging, and subscriber database or can also be deployed as a standalone entity.

Finally, the 3GPP AAA server 526 performs authentication, authorization, and accounting (AAA) functions and may also act as an AAA proxy server. For WLAN 514 access to (3GPP) IP networks 510 the 3GPP AAA Server 526 provides authorization, policy enforcement, and routing information to various WLAN components. The 3GPP AAA Server 526 can generate and report charging/accounting information, performs offline charging control for the WLAN 514, and perform various protocol conversions when necessary.

While several possible examples are disclosed above, examples of the present disclosure are not so limited. For instance, while the systems and methods above are discussed with reference to use with cellular communications, the systems and methods can be used with other types of wired and wireless communications. In addition, while various components are discussed, other components could perform the same or similar functions without departing from the spirit of the invention.

Example Processes

Figure 6:
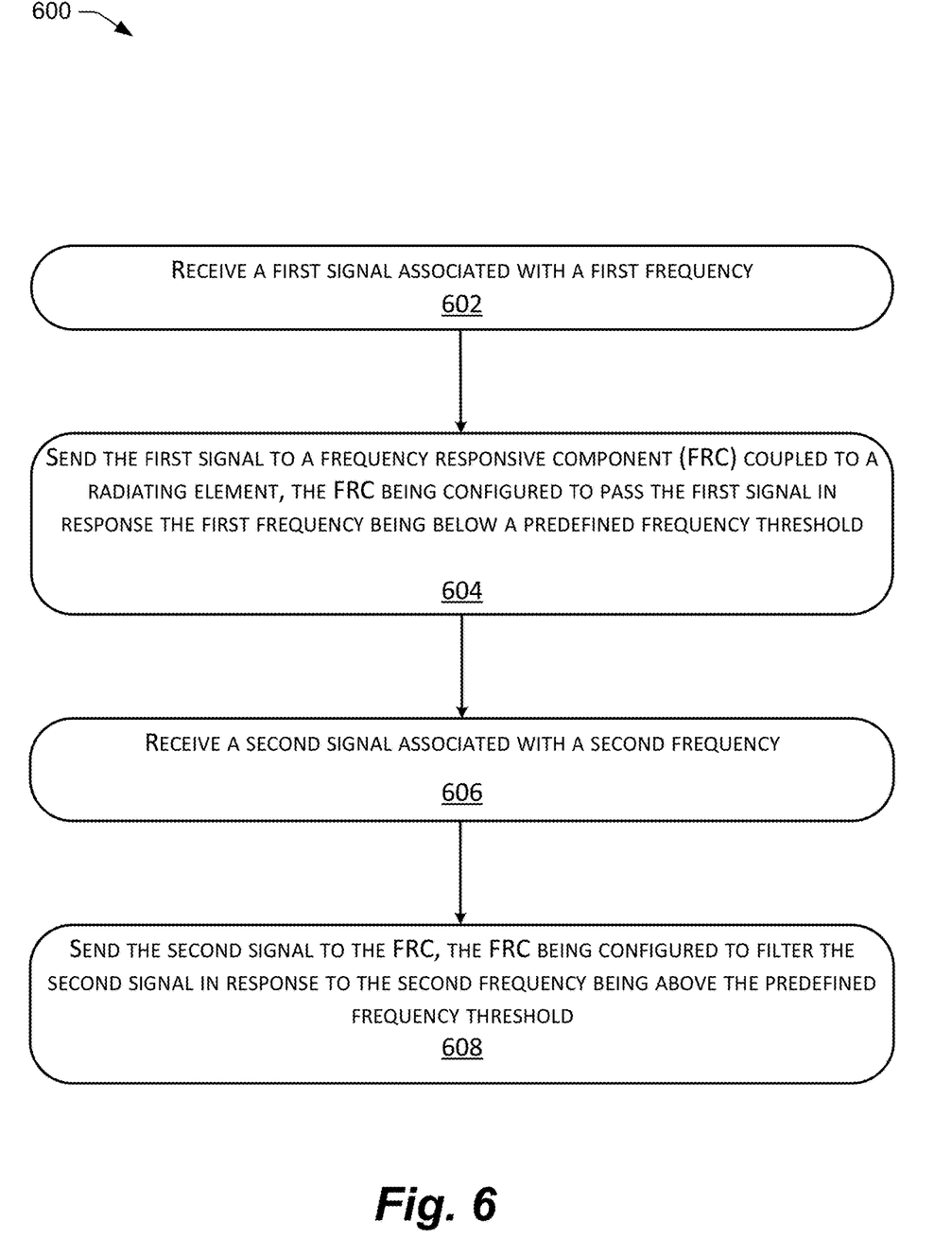
FIG. 6 depicts an example process for optimizing performance of an array antenna, in accordance with some examples of the present disclosure.
Figure 7:
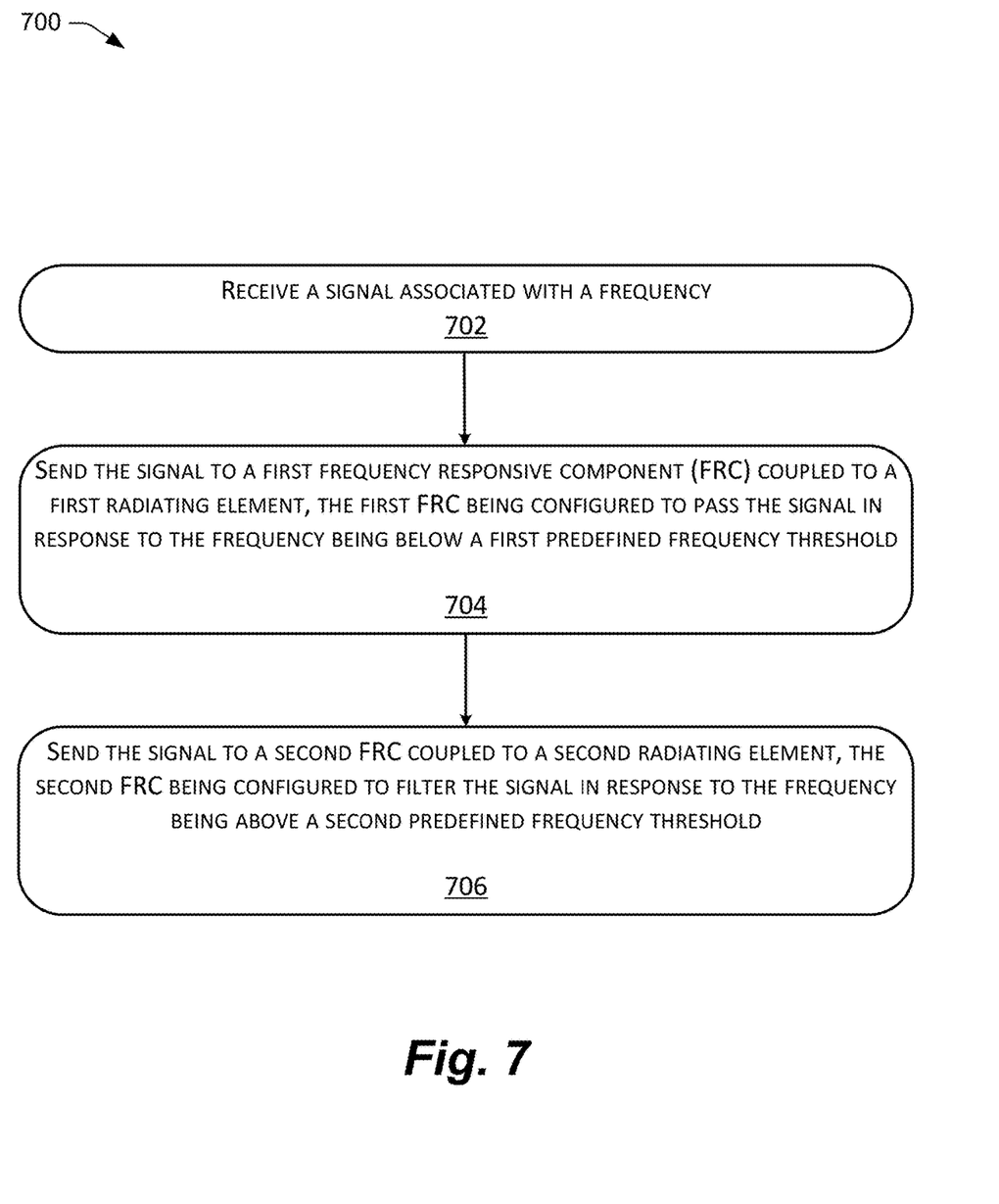
FIG. 7 depicts another example process for optimizing performance of an array antenna, in accordance with some examples of the present disclosure.

FIGS. 6 and 7 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described should not be construed as a limitation, and any number of the described operations can be combined in any order and/or in parallel to implement the processes. Individual operations may also be omitted.

As shown in FIG. 6, examples of the present disclosure can also comprise a method 600 for optimizing performance of an array antenna.

For example, at operation 602, an antenna fixture can receive a first signal associated with a first frequency. For example, the array antenna 104 may receive a signal via the antenna port 110. The signal may be received from a telecommunications network via a wired or wireless connection and may be associated with an operating frequency.

At operation 604, an antenna fixture can send the first signal to a frequency responsive component (FRC) coupled to a radiating element located within the antenna fixture, the FRC being configured to pass the first signal in response to determining that the first frequency is below a predefined threshold. For example, the radiating element 106(1) may be coupled to the FRC 108(1) and the radiating element 106(2) may be coupled to the FRC 108(2). Depending on the frequency that the signal is associated with, either one of, or both of, the FRC 108(1) and the FRC 108(2) may be configured to block the signal from reaching the radiating element 106(1) and/or the radiating element 106(2). For example, the FRC 108(1) and the FRC 108(2) may be configured to block the signal at and/or above a threshold frequency that is associated with the signal. In some cases, the threshold frequency may be the same. In other cases, the threshold frequency may be different for the FRC 108(1) and the FRC 108(2). In some cases, each radiating element 106 may be coupled with an FRC and each FRC may be configured to block the signal at or above a threshold frequency.

At operation 606, an antenna fixture can receive a second signal associated with a second frequency and at operation 608, the antenna fixture send can the second signal to the FRC, the FRC being configured to filter the second signal in response to determining that the second frequency is above the predefined threshold. For example, the FRC 108(1) may be configured to block the signal when receiving a signal associated with frequencies at and/or above a first value and the FRC 108(2) may be configured to block the signal when receiving a signal associated with frequencies at and/or above a second value. In this case, if the array antenna 104 receives a signal associated with a frequency between the first value and the second value, then the FRC 108(1) may filter the signal from reaching the radiating element 106(1) and the FRC 108(2) may not be configured to block the signal, thereby allowing the signal to reach the radiating element 106(2). In another example, the FRC 108(1) may be configured to block the signal when receiving a signal associated with frequencies at and/or above a first value and the FRC 108(2) may be configured to block the signal when receiving a signal associated with frequencies at and/or above a second value. In this case, if the array antenna 104 receives a signal associated with a frequency below the first value and the second value, then the FRC 108(1) may not be configured to block the signal, thereby allowing the signal to reach the radiating element 106(1) and the FRC 108(2) may not be configured to block the signal, thereby allowing the signal to reach the radiating element 106(2). In another example, the FRC 108(1) may be configured to block the signal when receiving a signal associated with frequencies at and/or above a first value and the FRC 108(2) may be configured to block the signal when receiving a signal associated with frequencies at and/or above a second value. In this case, if the array antenna 104 receives a signal associated with a frequency of above the first value and the second value, then the FRC 108(1) may filter the signal from reaching the radiating element 106(1) and the FRC 108(2) may filter the signal from reaching the radiating element 106(2).

As shown in FIG. 7, examples of the present disclosure can also comprise a method 700 for optimizing performance of an array antenna.

For example, at operation 702, an antenna fixture can receive a signal associated with a frequency. For example, the array antenna 104 may receive a signal via the antenna port 110. The signal may be received from a telecommunications network via a wired or wireless connection and may be associated with an operating frequency.

At operation 704, an antenna fixture can send the signal to a first frequency responsive component (FRC) coupled to a first radiating element located within the antenna fixture, the first FRC being configured to pass the signal in response to determining that the frequency is below a first predefined threshold. For example, the radiating element 106(1) may be coupled to the FRC 108(1) and the radiating element 106(2) may be coupled to the FRC 108(2). Depending on the frequency that the signal is associated with, either one of, or both of, the FRC 108(1) and the FRC 108(2) may be configured to block the signal from reaching the radiating element 106(1) and/or the radiating element 106(2). For example, the FRC 108(1) and the FRC 108(2) may be configured to block the signal at and/or above a threshold frequency that is associated with the signal. In some cases, the threshold frequency may be the same. In other cases, the threshold frequency may be different for the FRC 108(1) and the FRC 108(2). In some cases, each radiating element 106 may be coupled with an FRC and each FRC may be configured to block the signal at and/or above a threshold frequency.

At operation 706, an antenna fixture can send the signal to a second FRC coupled to a second radiating element located within the antenna fixture, the second FRC being configured to filter the signal in response to determining that the frequency is above a second predefined threshold. For example, the FRC 108(1) may be configured to block the signal when receiving a signal associated with frequencies at and/or above a first value and the FRC 108(2) may be configured to block the signal when receiving a signal associated with frequencies at and/or above a second value. In this case, if the array antenna 104 receives a signal associated with a frequency between the first value and the second value, then the FRC 108(1) may filter the signal from reaching the radiating element 106(1) and the FRC 108(2) may not be configured to block the signal, thereby allowing the signal to reach the radiating element 106(2). In another example, the FRC 108(1) may be configured to block the signal when receiving a signal associated with frequencies at and/or above a first value and the FRC 108(2) may be configured to block the signal when receiving a signal associated with frequencies at and/or above a second value. In this case, if the array antenna 104 receives a signal associated with a frequency below the first value and the second value, then the FRC 108(1) may not be configured to block the signal, thereby allowing the signal to reach the radiating element 106(1) and the FRC 108(2) may not be configured to block the signal, thereby allowing the signal to reach the radiating element 106(2). In another example, the FRC 108(1) may be configured to block the signal when receiving a signal associated with frequencies at and/or above a first value and the FRC 108(2) may be configured to block the signal when receiving a signal associated with frequencies at and/or above a second value. In this case, if the array antenna 104 receives a signal associated with a frequency of above the first value and the second value, then the FRC 108(1) may filter the signal from reaching the radiating element 106(1) and the FRC 108(2) may filter the signal from reaching the radiating element 106(2).

CONCLUSION

While several possible examples are disclosed above, examples of the present disclosure are not so limited. For instance, while various optimization conditions and characteristics are discussed for use with the system, other conditions and characteristics can be utilized in a similar fashion. In addition, the location and configuration used for various features of examples of the present disclosure such as, for example, the layout of the environment 100 and 200, for example, can be varied according to a particular network, device, access point, or location that requires a slight variation due to, for example, size or power constraints, the type of processing required, or regulations related to transmission interference, for example. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. An antenna system comprising:
one or more processors;
memory storing instructions;
a radome;
a first radiating element located within the radome;
a first frequency responsive component (FRC) coupled to the first radiating element, the first FRC to pass a first signal associated with a first frequency and to filter a second signal associated with a second frequency that is higher than the first frequency, wherein the first FRC is configured to receive the first signal and the second signal via a first pathway to the first radiating element;
a second radiating element located within the radome, the second radiating element being different than the first radiating element; and
a second FRC coupled to the second radiating element, the second FRC to pass a third signal associated with a third frequency that is higher than the second frequency and to filter a fourth signal associated with a fourth frequency that is higher than the third frequency, wherein the second FRC is configured to receive the third signal and the fourth signal via a second pathway to the second radiating element, the instructions causing the one or more processors to:
receive an instruction, from a node in a network, to operate at a fifth frequency using a fifth signal associated with the fifth frequency, the instruction being a first transmission and the fifth signal being a second transmission that is different than the first transmission;
determine a radiating element of a plurality of radiating elements located within the radome in which to filter the fifth signal from being transmitted based at least in part on the instruction; and
adjust a cut-off frequency threshold of an FRC associated with the radiating element of the plurality of radiating elements, wherein adjusting the cut-off frequency threshold of the FRC causes an aperture value associated with the antenna system to remain within a threshold value when operating at the fifth frequency.

2. The antenna system as recited in claim 1, wherein the antenna system comprises a wide band passive array antenna.

3. The antenna system as recited in claim 1, wherein the first frequency is associated with a first aperture value, the second frequency is associated with a second aperture value, the third frequency is associated with a third aperture value, and the fourth frequency is associated with a fourth aperture value.

4. The antenna system as recited in claim 3, wherein at least one of the first FRC or the second FRC causes the first aperture value, the second aperture value, the third aperture value, and the fourth aperture value to be substantially similar.

5. The antenna system as recited in claim 1, wherein the antenna system comprises at least one of a linear array or a two-dimensional planar array.

6. The antenna system as recited in claim 1, wherein at least one of the first FRC or the second FRC comprise a low pass filter.

7. A method for operating in a device comprising:
passing, via a first frequency responsive component (FRC) coupled to a first radiating element, a first signal associated with a first frequency and filtering a second signal associated with a second frequency that is higher than the first frequency, wherein the first FRC is configured to receive the first signal and the second signal via a first pathway to the first radiating element;

passing, via a second FRC coupled to a second radiating element that is different than the first radiating element, a third signal associated with a third frequency that is higher than the second frequency and filtering a fourth signal associated with a fourth frequency that is higher than the third frequency, wherein the second FRC is configured to receive the third signal and the fourth signal via a second pathway to the second radiating element, receiving an instruction, from a node in a network, to operate at a fifth frequency using a fifth signal associated with the fifth frequency, the instruction being a first transmission and the fifth signal being a second transmission that is different than the first transmission;

determining a radiating element of a plurality of radiating elements in which to filter the fifth signal from being transmitted based at least in part on the instruction; and adjusting a cut-off frequency threshold of an FRC associated with the radiating element of the plurality of radiating elements, wherein adjusting the cut-off frequency threshold of the FRC causes an aperture value associated with an antenna system to remain within a threshold value when operating at the fifth frequency.

8. The method as recited in claim 7, wherein the antenna system comprises a wide band passive array antenna.

9. The method as recited in claim 7, wherein the first frequency is associated with a first aperture value, the second frequency is associated with a second aperture value, the third frequency is associated with a third aperture value, and the fourth frequency is associated with a fourth aperture value.

10. The method as recited in claim 9, wherein at least one of the first FRC or the second FRC causes the first aperture value, the second aperture value, the third aperture value, and the fourth aperture value to be substantially similar.

11. The method as recited in claim 7, wherein the antenna system comprises at least one of a linear array or a two-dimensional planar array.

12. The method as recited in claim 7, wherein at least one of the first FRC or the second FRC comprise a low pass filter.

13. A device comprising:
one or more processors;
memory storing instructions;
a radome;
  a first radiating element located within the radome;
  a first frequency responsive component (FRC) coupled to the first radiating element, the first FRC to pass a first signal associated with a first frequency and to filter a second signal associated with a second frequency that is higher than the first frequency, wherein the first FRC is configured to receive the first signal and the second signal via a first pathway to the first radiating element;
  a second radiating element located within the radome, the second radiating element being different than the first radiating element; and
  a second FRC coupled to the second radiating element, the second FRC to pass a third signal associated with a third frequency that is higher than the second frequency and to filter a fourth signal associated with a fourth frequency that is higher than the third frequency, wherein the second FRC is configured to receive the third signal and the fourth signal via a second pathway to the second radiating element,
the instructions causing the one or more processors to:
  receive an instruction, from a node in a network, to operate at a fifth frequency using a fifth signal associated with the fifth frequency, the instruction being a first transmission and the fifth signal being a second transmission that is different than the first transmission;
  determine a radiating element of a plurality of radiating elements located within the radome in which to filter the fifth signal from being transmitted based at least in part on the instruction; and
  adjust a cut-off frequency threshold of an FRC associated with the radiating element of the plurality of radiating elements, wherein adjusting the cut-off frequency threshold of the FRC causes an aperture value associated with the antenna system to remain within a threshold value when operating at the fifth frequency.

14. The device as recited in claim 13, wherein the antenna system comprises a wide band passive array antenna.

15. The device as recited in claim 13, wherein the first frequency is associated with a first aperture value, the second frequency is associated with a second aperture value, the third frequency is associated with a third aperture value, and the fourth frequency is associated with a fourth aperture value.

16. The device as recited in claim 15, wherein at least one of the first FRC or the second FRC causes the first aperture value, the second aperture value, the third aperture value, and the fourth aperture value to be substantially similar.

17. The device as recited in claim 13, wherein the antenna system comprises at least one of a linear array or a two-dimensional planar array.

18. The device as recited in claim 13, wherein at least one of the first FRC or the second FRC comprise a low pass filter.

* * * * *